No. 628,862. Patented July 11, 1899.
C. H. SMITH.
WHEEL.
(Application filed Mar. 15, 1899.)
(No Model.)
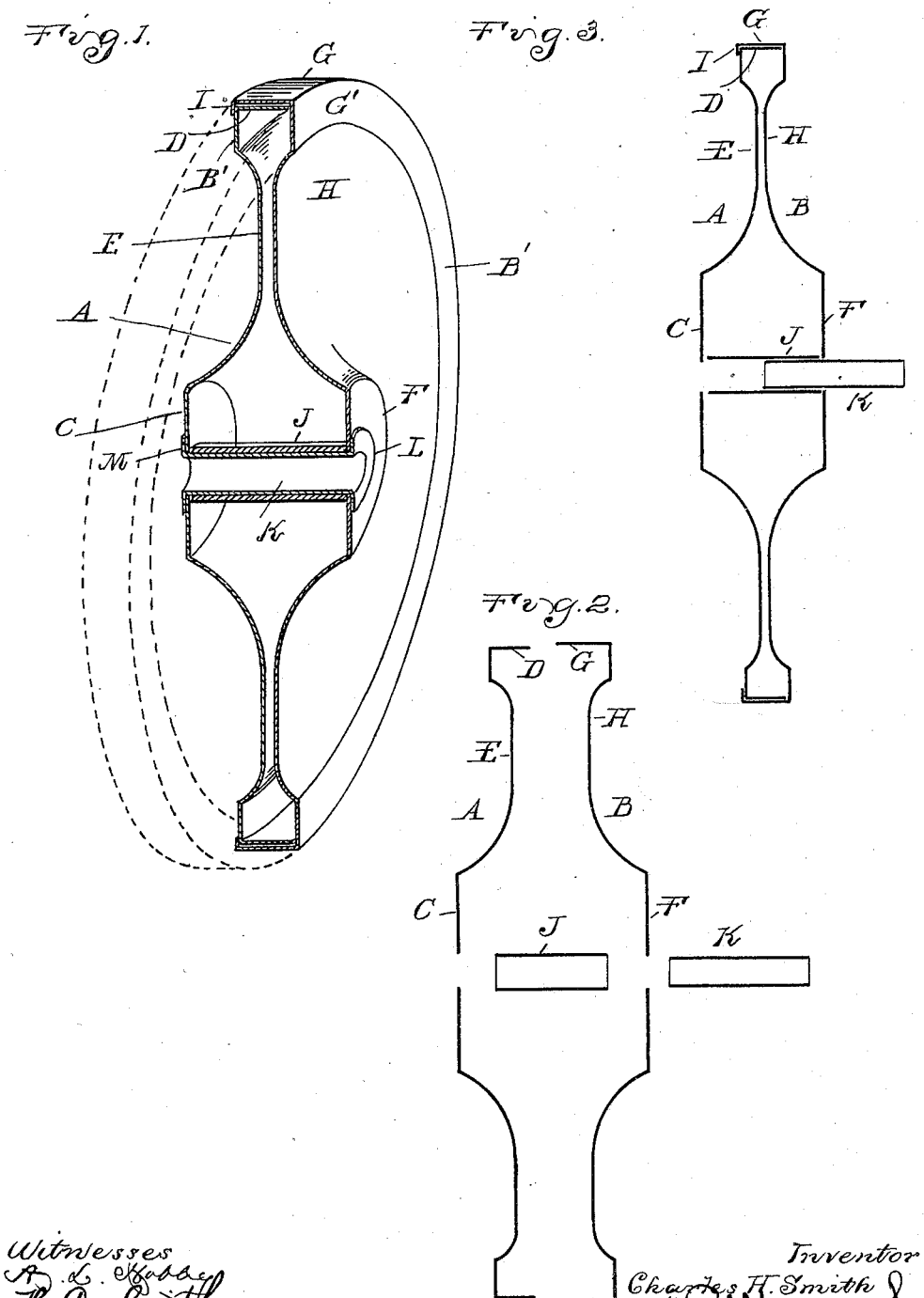
Witnesses
Inventor
Charles H. Smith

UNITED STATES PATENT OFFICE.

CHARLES H. SMITH, OF DETROIT, MICHIGAN.

WHEEL.

SPECIFICATION forming part of Letters Patent No. 628,862, dated July 11, 1899.

Application filed March 15, 1899. Serial No. 709,180. (No model.)

*To all whom it may concern:*

Be it known that I, CHARLES H. SMITH, a citizen of the United States, residing at Detroit, in the county of Wayne and State of Michigan, have invented certain new and useful Improvements in Wheels, of which the following is a specification, reference being had therein to the accompanying drawings.

The invention has reference to an improved wheel particularly designed for use in connection with toy vehicles; and it consists, essentially, in the novel construction of the wheel and the peculiar arrangement and combination of the various parts thereof, as will be more fully hereinafter described and shown.

In the drawings, Figure 1 is a sectional perspective view of the wheel. Fig. 2 is a diagram section showing the several wheel parts detached, and Fig. 3 is a similar section showing the complementary sections of the wheel assembled.

In construction the wheel consists of two main sections or members A and B, formed of sheet metal. The blank from which the section A is formed is pressed by suitable mechanism into the shape shown in Fig. 1 to form a broad flat central portion C, constituting the hub of the section, a tread portion D, a depressed or dished portion E, constituting the section-web, the latter being formed substantially parallel with the hub and arranged beneath the tread, and a felly B', connecting the dished portion and tread, said felly extending downwardly from the tread in a plane parallel with the hub and depressed portion of the member and intermediate the two latter portions. The section B is of greater diameter than its complementary section and is provided with the complementary portions F, G, G', and H, designating, respectively, the hub, tread, felly, and web of said section. The tread G is likewise of greater width than the tread D, and each section is centrally apertured.

In assembling the wheel parts the section A is driven within its complementary section B until the webs of the two sections are in contact. The outer edge of the tread G is then turned over upon the section A, forming a securing-flange I, which effectively clamps the sections together.

The hub proper for the wheel is formed by interposing between the section-hubs a spacing-sleeve J of greater diameter than the apertures in the hubs and by driving within said sleeve and through the section-hubs a tube K. The latter is retained in its proper relative position and fixedly secured to the wheel-sections by flanges L and M, formed by turning over the ends of said tube upon the section-hubs, as plainly shown in Fig. 1. By this manner of construction it will be observed that an exceedingly strong and serviceable wheel is obtained, which is of such simple construction as will permit of its being easily and cheaply manufactured.

What I claim as my invention is—

A wheel composed of a main section or member consisting of a flat central and apertured portion C, constituting the hub of the section, the tread portion D, the depressed or dished portion E constituting the section-web, the latter being formed substantially parallel with the face of the hub and arranged beneath the tread, and a felly B' connecting the dished portion and tread, said felly extending downwardly from the tread in a plane parallel with the planes of the hub and dished portions and intermediate said latter planes, a complementary section having complementary web, hub, felly and tread portions formed thereon, the tread portion of one section being arranged over the tread of the complementary section, and means for holding the sections to each other, comprising a securing-flange formed by turning over upon the felly of one section, the edge of the overlapping tread upon the complementary section, a spacing-sleeve interposed between the complementary section-hubs and registering with the apertures in said hubs, a tube extending within the sleeve and through the hubs, and retaining-flanges formed by turning over the ends of said tube upon the complementary hubs.

In testimony whereof I affix my signature in presence of two witnesses.

CHARLES H. SMITH.

Witnesses:
 M. B. O'DOGHERTY,
 H. C. SMITH.